United States Patent
Bradley (10) Patent No.: US 9,619,302 B2
(45) Date of Patent: Apr. 11, 2017

(54) DISTRIBUTED LOCKING METHOD AND SYSTEM FOR NETWORKED DEVICE MANAGEMENT

(75) Inventor: Mark W. Bradley, Boulder, CO (US)

(73) Assignee: CA, Inc., New York, NY (US)

(\*) Notice: Subject to any disclaimer, the term of this patent is extended or adjusted under 35 U.S.C. 154(b) by 1363 days.

(21) Appl. No.: 11/092,851

(22) Filed: Mar. 28, 2005

(65) Prior Publication Data

US 2006/0053111 A1 Mar. 9, 2006

Related U.S. Application Data (63) Continuation of application No. 10/889,714, filed on Jul. 12, 2004, now abandoned.

(60) Provisional application No. 60/487,066, filed on Jul. 11, 2003.

(51) Int. Cl.
*G06F 17/30* (2006.01)
*G06F 9/52* (2006.01)
*H04L 12/26* (2006.01)

(52) U.S. Cl.
CPC .......... *G06F 9/526* (2013.01); *H04L 43/0817* (2013.01); *G06F 17/30171* (2013.01); *G06F 17/30362* (2013.01); *G06F 2209/522* (2013.01)

(58) Field of Classification Search
CPC ............... G06F 2209/522; G06F 9/526; G06F 17/30362; G06F 17/30171; H04L 43/0817; Y10S 707/99933; Y10S 707/99938
USPC ........................................................... 707/8
See application file for complete search history.

(56) References Cited

U.S. PATENT DOCUMENTS

| | | | |
|---|---|---|---|
| 5,933,825 A * | 8/1999 | McClaughry et al. | 707/8 |
| 6,385,613 B1 * | 5/2002 | Grewell et al. | 707/8 |
| 6,529,983 B1 * | 3/2003 | Marshall et al. | 710/200 |
| 6,539,446 B1 * | 3/2003 | Chan | 710/200 |
| 6,701,438 B1 * | 3/2004 | Prabandham | H04L 63/1425 707/999.01 |
| 6,751,616 B1 * | 6/2004 | Chan | 707/8 |
| 6,959,337 B2 * | 10/2005 | McLaughlin et al. | 709/229 |
| 6,988,130 B2 * | 1/2006 | Blumenau et al. | 709/213 |
| 7,069,317 B1 * | 6/2006 | Colrain et al. | 709/224 |
| 7,113,995 B1 * | 9/2006 | Beukema et al. | 709/229 |
| 2003/0065760 A1 * | 4/2003 | Casper et al. | 709/223 |
| 2003/0079155 A1 * | 4/2003 | Kingsbury | 714/2 |
| 2003/0167420 A1 * | 9/2003 | Parsons | 714/10 |
| 2004/0066741 A1 * | 4/2004 | Dinker et al. | 370/216 |
| 2004/0088396 A1 * | 5/2004 | Hammons et al. | 709/223 |
| 2004/0220933 A1 * | 11/2004 | Walker | 707/8 |

OTHER PUBLICATIONS

European Patent Office (EPO) Communication/Search Report regarding Application PCT/US2004022623 (5 pages), Jul. 8, 2010.
Cardoza, et al.; "Overview of Digital UNIX Cluster System Architecture";Digital Equipment Corporation, pp. 254-259, 1996.

(Continued)

*Primary Examiner* — Shew-Fen Lin
(74) *Attorney, Agent, or Firm* — Baker Botts L.L.P.

(57) ABSTRACT

A system and method for distributed locking for networked device management is provided. In one aspect, a lock is granted for a resource attached to a switched fabric, in response to receiving a request to access the resource. If the resource is already locked by another process or device, or otherwise unavailable, the request may be queued or failed.

16 Claims, 5 Drawing Sheets

(56) References Cited

OTHER PUBLICATIONS

Nishio, et al.; "A Time-Out Based Resilient Token Transfer Algorithm for Mutual Exclusion in Computer Networks"; pp. 386-393), 1989.
Hastings, Andrew B.; "Distributed Lock Management in a Transaction Processing Environment"; Carnegie Mellon University, pp. 22-31, 1990.
European Patent Office (EPO) Communication regarding Application 04 778 228.9-2211 (6 pages), Dec. 30, 2010.
European Patent Office (EPO) Communication regarding Application 04 778 228.9-2211 (5 pages) dated Mar. 15, 2012, received Mar. 29, 2012.
European Patent Office (EPO) Communication regarding Application 04 778 228.9-2211 (45 pages) dated Jul. 13, 2012, received Aug. 8, 2012.

* cited by examiner

DISTRIBUTED LOCKING METHOD AND SYSTEM FOR NETWORKED DEVICE MANAGEMENT

CROSS-REFERENCE TO RELATED APPLICATIONS

This application is a Continuation of U.S. Ser. No. 10/889,714 filed on Jul. 12, 2004 now abandoned and claims the benefit of U.S. Provisional Application No. 60/487,066 entitled DISTRIBUTED LOCKING METHOD AND SYSTEM FOR NETWORKED DEVICE MANAGEMENT filed on Jul. 11, 2003, the entire disclosure of which is incorporated herein by reference.

TECHNICAL FIELD

The present application relates to computer systems, and particularly to distributed computer systems.

BACKGROUND

In traditional computing architecture, storage devices such as hard disks and floppy disks have been directly attached to the computer systems that access the storage devices. Recent development in technology, however, has led to a topology of systems where storage devices are attached to various switched fabrics, instead of being directly attached to a particular computer system. Examples of switched fabrics include a switched fabric implementing network protocols such as the TCP/IP, software and/or hardware stacks, and wireless networks. The devices attached to these switched fabrics, referred to as networked devices (NDs), are able to operate, for example, on IP networks, and provide file sharing and storage services. Although these NDs have the capability to communicate over such fabrics, the NDs often lack the intelligence of the systems that historically hosted storage or other devices directly.

For example, NDs are typically part of a larger set of devices, systems, and components making up what is sometimes referred to as the enterprise. In an enterprise, it is desirable both to share resources and to preclude sharing of resources. For instance, a storage device in some cases may be shared among multiple consumers, while at other times, it is desirable to have the storage device accessed or controlled by one consumer or process at a time. Further, the entities that are accessed often do not have the intelligence to know when or what accesses are appropriate.

Accordingly, there is a need for a locking method and system, for example to control, manage, and/or provide access control to the various NDs, for example, to preclude multiple entities from accessing the NDs when a situation calls for it.

SUMMARY

A system and method for distributed locking in networked device management is provided. The method in one aspect receives a request for a resource attached to a switched fabric and determines if the resource is available. If the resource is available, a lock is granted on the resource so that a requestor may access the resource. The resource is locked so that no other entities may use the resource while the requester accesses and operates on the resource. In one embodiment, if the resource is already locked, the request may be queued or may be failed.

In another aspect, the method includes creating a lock domain comprising a plurality of requesters and one or more resources attached to a switched fabric. A lock manager is provided to control the use of the one or more resources by the plurality of requestors. The lock manager, in one aspect, receives requests for the one or more resources from the plurality of requesters, and grants a lock for the one or more resources to the plurality of requestors in response to the requests.

Further yet, the method in one aspect determines if the lock manager is not responding, and if it is determined that the lock manager is not responding, attempts to terminate the lock manager. A new lock domain is created and the plurality of requesters and one or more resources attached to a switched fabric in the lock domain are notified of the new lock domain. A new lock manager is invoked, and the existing lock information is collected so that the new lock manager may resume the lock management operations seamlessly.

A system for distributed locking for networked device management in one aspect includes a lock manager in response to receiving requests for a resource attached to a switched fabric, operable to determine whether the resource is available. If the resource is available, the lock manager is further operable to grant lock to the resource to allow a requestor to use the resource. The resource is unavailable to other requesters while the requester is using the resource.

Further features as well as the structure and operation of various embodiments are described in detail below with reference to the accompanying drawings. In the drawings, like reference numbers indicate identical or functionally similar elements.

DETAILED DESCRIPTION

Figure 1:
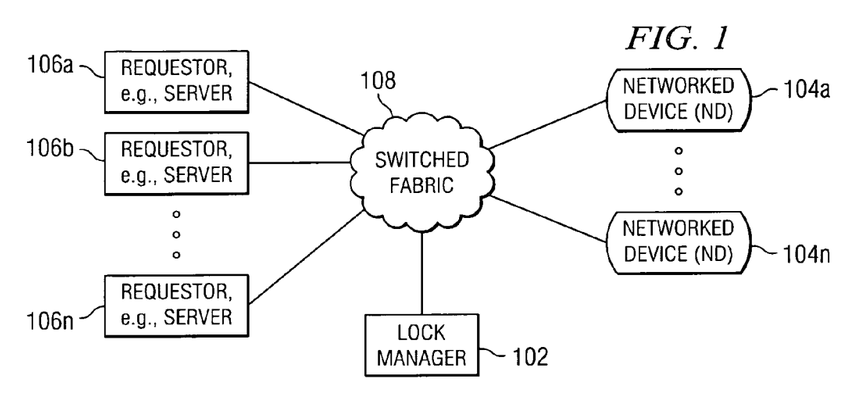
FIG. 1 is an architectural diagram illustrating the distributed locking for networked device management in one embodiment.

The present disclosure describes a system and method for distributed locking for networked device management. FIG. 1 is an architectural diagram illustrating the distributed locking for networked device management in one embodiment. A lock manager 102 in one aspect provides management for a set of objects or devices 104a . . . 104n. These objects or devices 104a . . . 104n are attached to a switched fabric 108, for example, an IP network. When resource conflict avoidance is desired, the lock manager 102 may be used for performing operations on the resources 104a . . .

104n. Operations that require resource management include write operations or similar non-passive operation.

The lock manager 102, in one embodiment, grants a lock for the resource so that the operation or set of operations may be performed on the resource. For example, the lock manager 102 may grant a lock to a requester 106a . . . 106n when the resource being requested is free.

A group of managed objects 104a . . . 104n and clients 106a . . . 106n, also referred to as management requestors 106a . . . 106n, performing management operations on managed objects is referred to as a lock domain. The requestors 106a . . . 106n may be any computing devices or servers that need to use the resources 104a . . . 104n. In one aspect, the requestors 106a . . . 106n typically are non-cooperative, that is, one is not aware of another's requests for the resources 104a . . . 104n. In one embodiment, a requestor 106a . . . 106n obtains necessary locks prior to performing non-passive operations on managed objects 104a . . . 104n. Typically, the objects or resources 104a . . . 104n being managed do not take part in the lock enforcement. In one embodiment, the objects or resources 104a . . . 104n being managed are unaware of the locks that they did not obtain on their own behalf.

Figure 2:
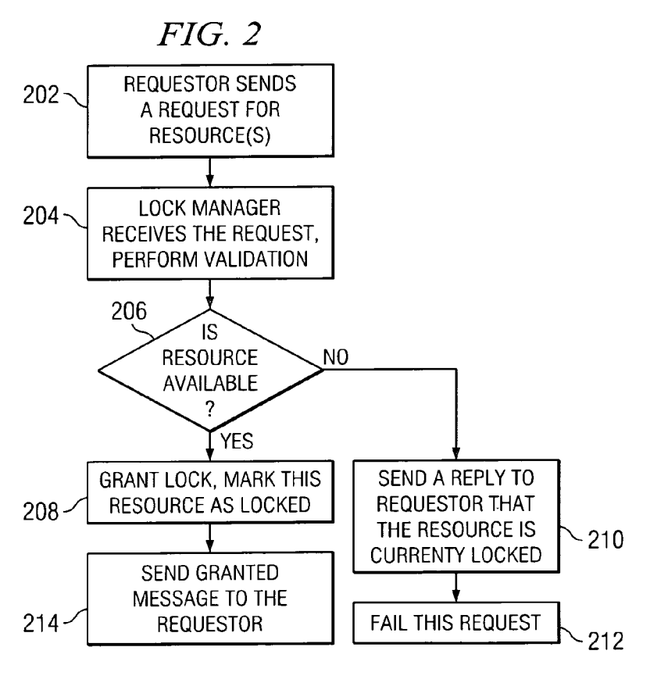
FIG. 2 is a flow diagram illustrating the distributed locking method for networked device management in one embodiment.

FIG. 2 is a flow diagram illustrating the distributed locking method of networked device management in one embodiment. At 202, a requester sends a request to use a resource attached to a network fabric. In one embodiment, a lock request may be sent in a form of a message. For example, a message header may include a lock request having a lock domain name, a requestor name, a managed object name, and an inheritance bit. The lock request may be transmitted in any other interface or form, suitable for communicating among devices and/or processes.

At 204, the lock manager receives this request, and validates that the request originated from a valid member of its lock management group by, for example, checking the requestor name. Further, the lock manager may check the inheritance bit sent in the lock request to determine the type of a lock to grant. Inheritance means that a lock granted for any managed object applies to its children as well. In one embodiment, inheritance is implied in a lock. For example, if a lock is granted for disk array controller XYZ, the lock applies to the volumes alpha and beta that are controlled by XYZ. To override this implication or default functionality, an inheritance bit may be used. When an inheritance bit is set, inheritance is turned off, that is, the lock applies only to the parent object.

At 206, the lock manager determines if the resource being requested is available. At 208, if the resource is available, a lock is granted. At 214, a message may be sent to the requestor so that the requester may begin to use the resource. At 210, if the resource is already locked, for example, because it is in use, or otherwise unavailable, a message is sent to the requestor that the resource is currently unavailable. At 212, the request is either queued or is failed.

Figure 3:
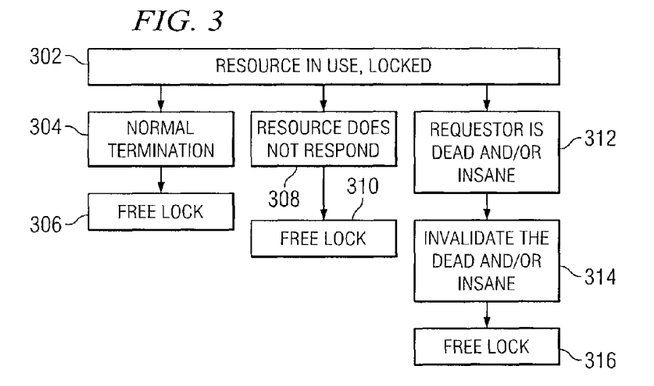
FIG. 3 illustrates a method of freeing a lock in one embodiment.
Figure 6:
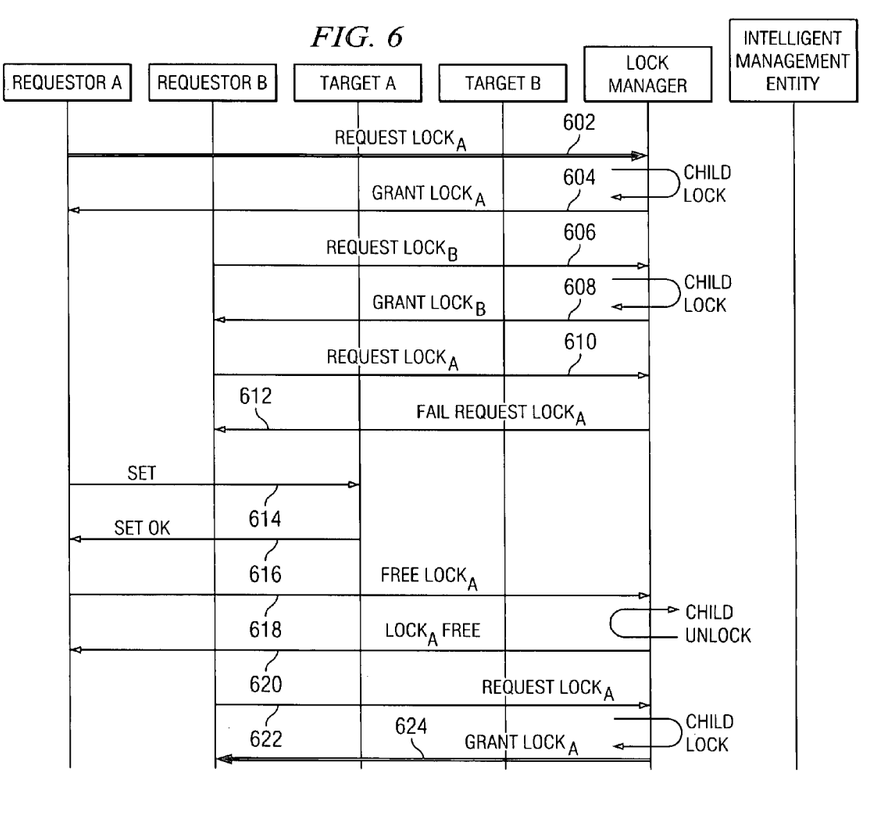
FIG. 6 is a ladder diagram illustrating detailed normal lock operation in one embodiment of the present disclosure.

In one embodiment, locks are persistent. That is, there is no timeout for a lock. Accordingly, in one embodiment, locks need to be explicitly freed to allow other requesters to use the resource. FIG. 3 illustrates a method of freeing a lock in one embodiment. At 302, a resource is in use and locked. At 304, a normal freeing may be performed by an original requestor of a lock after a termination, successful or otherwise, of the requested operation. The requester may notify the lock manager that it is finished with using the resource, and the lock manager in response may free the lock. FIG. 6, for example, is a ladder diagram illustrating detailed normal lock operation in one embodiment of the present disclosure.

At 602, Requestor A requests a resource, Target A, and is granted Lock A at 604. In one aspect, when a lock is granted for Target A, all children resources of Target A are also granted. Similarly, at 606, Requestor B requests a resource, Target B, and is granted Lock B at 608. At 610, Requestor B also requests Target A. Target A is, however, locked, and is in use by Requestor A. Accordingly, at 612, Requestor B's request for Target A fails at 612. At 614, Requestor A performs its operation on Target A, and at 616, the operation terminates with "OK" status. That is, for example, Target A notifies Requestor A of the finished operation, either successful or otherwise. At 618, the lock manager frees Lock A, and at 620, Lock A is "Free" for use by other requestors. In one aspect, when a lock for a resource is freed, all children resources are also freed. At 622, Requestor B's request is received and at 624, Lock A is granted to Requestor B.

In one embodiment, abnormal lock freeing may occur, for example, on a timeout basis. Referring back to FIG. 3, at 308, a resource may malfunction during an operation, and thus do not respond or reply back to the requester. Based on this reply timeout, a lock manager may free the lock on the resource as shown at 310. For example, the requestor upon not receiving any response from the resource within an allocated amount of time, for instance, may send a message to the lock manager that the resource may be malfunctioning. Lock manager then may free the lock on the resource and perform any debugging operations that may be necessary to bring the resource back to a working condition.

Figure 7:
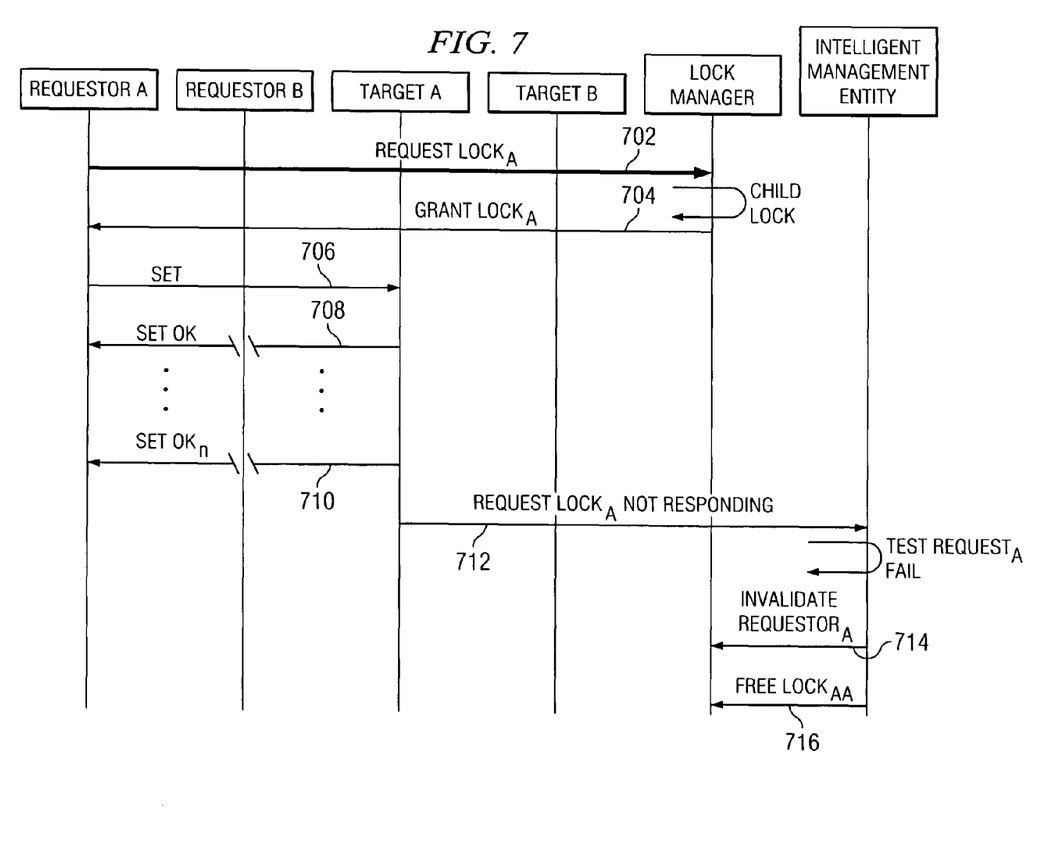
FIG. 7 is a ladder diagram illustrating detailed abnormal lock operation in one embodiment of the present disclosure.

FIG. 7, for example, is a ladder diagram illustrating detailed abnormal lock operation in one embodiment of the present disclosure. At 702, Requestor A requests Target A and the Lock Manager grants Lock A at 704. In one aspect, all children resources of Target A are also granted. At 706, Requestor A performs an operation on Target A, and waits for a return reply from Target A. At 708, no reply is received from Target A. Requestor A waits until a predetermined amount of time has passed, for example, a timeout period, as shown at 710. At 712, an entity or an independent application, for example, Intelligent Management Entity, determines that Target A is not responding. Alternatively, Requestor A in not receiving a response from Target A within the timeout period notifies the Lock Manager or the Intelligent Management Entity. At 714, the Intelligent Management Entity performs a test on Target A and if the test fails, sends a message to Lock Manager to free lock on A from Requestor A at 716.

Referring back to FIG. 3, a forced lock freeing at 316 may be performed by a lock manager, for example, when the lock manager or another requestor determines that a current holder of the lock is dead and/or insane at 312. For example, lack of response or occurrence of other protocol violation means dead and insane, respectively. Once the dead and/or insane entities are known to the lock manager, the lock manager, in one embodiment, invalidates dead and/or insane entities at 314 from valid lock management domain until the lock manager receives a request to add the entities back to the list of valid requestors. Until then, in one embodiment, any requests from dead and/or insane requestors fail without reply and an indication of attack is generated for the appropriate registrant for this indication.

Figure 8:
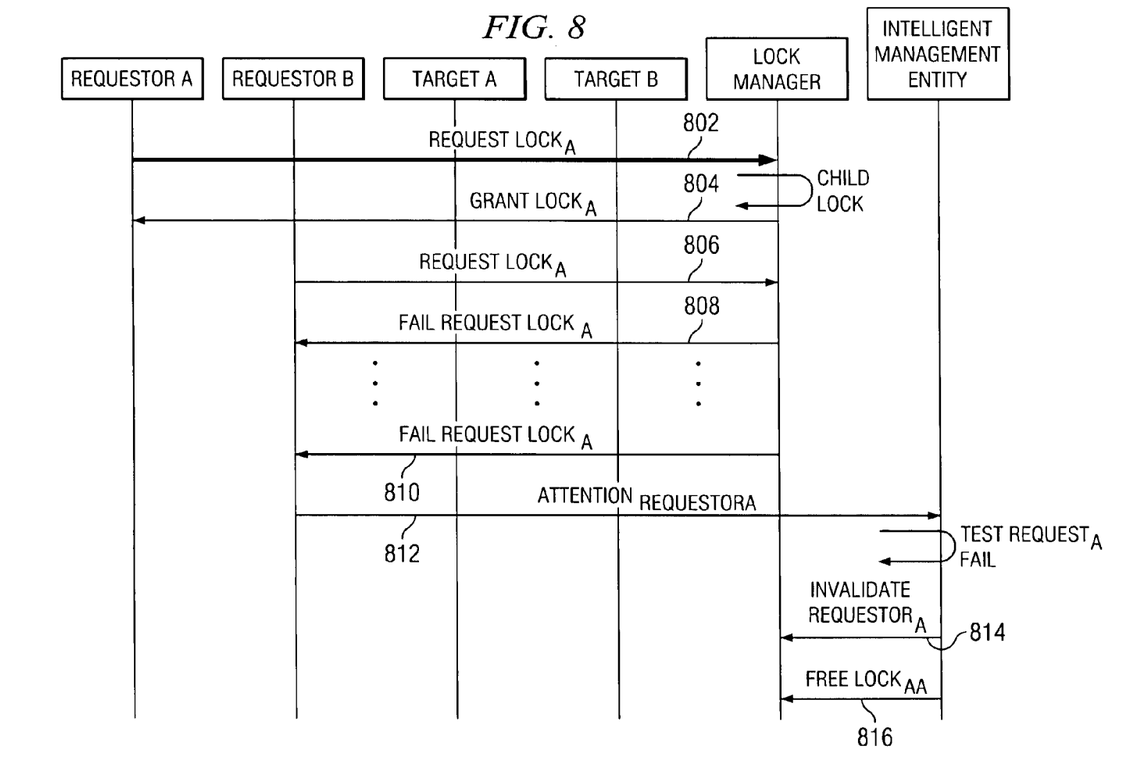
FIG. 8 is a ladder diagram illustrating detailed abnormal lock operation in another embodiment of the present disclosure.

FIG. 8, for example, is a ladder diagram illustrating detailed abnormal lock operation in another embodiment of the present disclosure. At 802, Requestor A requests for a resource, Target A, and at 804, lock is granted. At 808 and 810, it is determined that Requestor A is dead or insane. At 812, the Intelligent Management. Entity is notified of Requestor A's state. At 814, Requestor A is invalidated and at 816, lock on A is freed.

Figure 4:
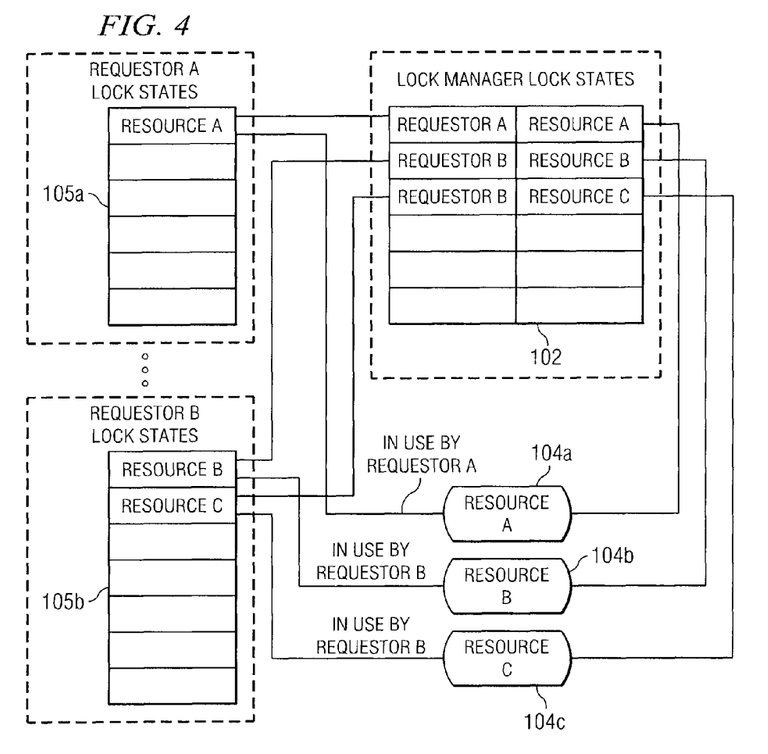
FIG. 4 is a diagram illustrating the lock states in one embodiment.

In one embodiment, lock state is maintained by the lock manager and by the requestor of a lock. FIG. 4 is a diagram illustrating the lock states in one embodiment. In one embodiment, one lock exists per target object 104a . . . 104c at one time. For each valid lock, the lock manager keeps the requestor name and managed object name as shown at 102. For each valid lock, the requestor keeps the managed object name as shown at 105a . . . 105b.

Figure 5:
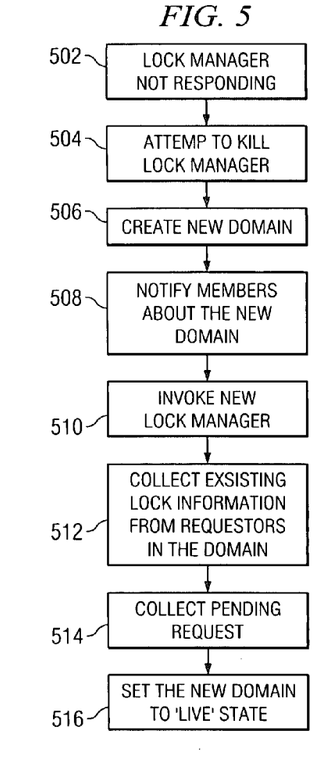
FIG. 5 is a flow diagram illustrating the lock manager fail-over method in one embodiment.

In one embodiment, the distributed locking for networked devices of the present disclosure provides a lock manager recovery method, for example, to institute when it is discovered that the lock manager is not functioning. FIG. 5 illustrates the lock manager fail-over method in one embodiment. At 502, when it is detected that a lock manager is not responding, a number of attempts is made to terminate the lock manager at 504. For example, if a requestor does not receive a response, the requestor notifies, for example, a management application or entity. That entity then may determine an appropriate action. A new lock manager domain is created at 506 and sent to the lock manager members, for example, the requestors and the resources in the domain at 508. For example, domains may be created through a management application. At 510, a new lock manager is invoked, by a management application. At 512, the new lock manager collects existing lock information, for example, from the requestors in the lock domain. The new lock domain is set to 'live' state at 516. In one embodiment, the pending requests are regenerated by the requesters using the new domain name and sent to the new lock manager as shown at 514. The locks in place are honored by the new lock manager, even if they were created previously by the defunct lock manager.

The system and method of the present disclosure may be implemented and run on a general-purpose computer. The embodiments described above are illustrative examples and it should not be construed that the present invention is limited to these particular embodiments. Various changes and modifications may be effected by one skilled in the art without departing from the spirit or scope of the invention as defined in the appended claims. For example, although particular formats for lock states have been described, it should be appreciated that the lock states may include other formats, and therefore is not limited only to the formats shown.

I claim:

1. A method for providing locking management for networked devices, comprising:
   receiving from a first requestor a first request for a resource attached to a switched fabric, the request comprising a message including a lock request, a lock domain name, a name of the first requestor, an inheritance bit, and a managed object name,
      wherein the lock domain name identifies one or more managed resources and one or more requestors that are permitted to perform operations on the one or more managed resources,
      wherein the inheritance bit allows inheritance by a child resource of the first requestor to be optional, and
      wherein the first requestor is different from the resource;
   determining that the first requestor is valid in response to receiving the request;
   determining if the resource is available;
   queuing the request if it is determined that the resource is not available to wait for the resource to become available; and
   when the resource becomes available, granting a lock for the first request in the queue based on the inheritance bit;
   granting the lock to the resource and children of the resource in response to determining the inheritance bit is not set;
   granting the lock to the resource only in response to determining the inheritance bit is set;
   determining if the requestor that sent the first request in the queue violated a protocol;
   in response to determining that the requestor that sent the first request in the queue violated the protocol:
      invalidating the requestor that sent the first request in the queue; and
      freeing the lock of the requestor that sent the first request in the queue;
   receiving a second request for a resource attached to the switched fabric;
   determining if the second request was sent by the invalidated requestor; and
   in response to determining that the second request was sent by the invalidated requestor, refusing the second request.

2. The method of claim 1, further including:
   freeing the lock of the requestor that sent the first request in the queue when an operation on the resource is terminated.

3. The method of claim 1, further including:
   determining if the resource is responding; and
   freeing the lock of the requestor that sent the first request in the queue if it is determined that the resource is not responding.

4. The method of claim 1, further including:
   failing the first request if it is determined that the resource is not available.

5. The method of claim 1, wherein determining that the first requestor is valid further comprises:
   checking a name of the first requestor.

6. The method of claim 1, wherein the lock of the requestor that sent the first request in the queue is persistent.

7. The method of claim 1, wherein, in response to determining that the second request was sent by the invalidated requestor, the method further comprises: generating an indicator for an administrator that an attack is occurring.

8. The method of claim 1, further comprising:
   receiving a message from the requestor that sent the first request in the queue indicating that the resource has not responded within a set period of time; and
   in response to receiving the message from the requestor that sent the first request in the queue indicating that the resource has not responded within a set period of time:
      freeing the lock of the requestor that sent the first request in the queue on the resource; and
      debugging the operation of the resource.

9. The method of claim 1, wherein the inheritance bit is not set, and wherein the method further comprises:
   when the resource becomes available, granting a lock for the child resource of the requestor that sent the first request in the queue; and
   in response to determining that the requestor that sent the first request in the queue violated the protocol, freeing the lock of the child resource of the requestor that sent the first request in the queue.

10. A program storage device readable by machine, tangibly embodying a program of instructions executable by the machine to perform method steps of providing locking management for networked devices, comprising:
receiving from a first requestor a first request for a resource attached to a switched fabric, the request comprising a message including a lock request, a lock domain name, a name of the first requestor, an inheritance bit, and a managed object name,
wherein the lock domain name identifies one or more managed resources and one or more requestors that are permitted to perform operations on the one or more managed resources,
wherein the inheritance bit allows inheritance by a child resource of the first requestor to be optional, and
wherein the first requestor is different from the resource;
determining that the first requestor is valid in response to receiving the request;
determining if the resource is available;
granting a lock, by a device apart from the resource, on the resource, if it is determined that the resource is available;
locking the resource if the lock is granted;
queuing the request if it is determined that the resource is not available to wait for the resource to become available; and
when the resource becomes available, granting a lock for the first request in the queue based on the inheritance bit;
granting the lock to the resource and children of the resource in response to determining the inheritance bit is not set;
granting the lock to the resource only in response to determining the inheritance bit is set;
determining if the requestor that sent the first request in the queue violated a protocol;
in response to determining that the requestor that sent the first request in the queue violated the protocol:
invalidating the requestor that sent the first request in the queue;
freeing the lock of the requestor that sent the first request in the queue; and
receiving a second request for a resource attached to the switched fabric;
determining if the second request was sent by the invalidated requestor; and
in response to determining that the second request was sent by the invalidated requestor:
refusing the second request;
generating an indicator for an administrator that an attack is occurring.

11. The program storage device of claim 10, further including:
failing the first request if it is determined that the resource is not available.

12. The program storage device of claim 10, wherein the program of instructions are further executable by the machine to perform method steps of:
freeing the lock of the requestor that sent the first request in the queue when an operation on the resource is terminated.

13. The program storage device of claim 10, wherein determining that the first requestor is valid further comprises:
checking a name of the first requestor.

14. The program storage device of claim 10, wherein the lock of the requestor that sent the first request in the queue is persistent.

15. The program storage device of claim 10, wherein the program of instructions are further executable by the machine to perform method steps of:
receiving a message from the requestor that sent the first request in the queue indicating that the resource has not responded within a set period of time; and
in response to receiving the message from the requestor that sent the first request in the queue indicating that the resource has not responded within a set period of time:
freeing the lock of the requestor that sent the first request in the queue on the resource; and
debugging the operation of the resource.

16. The program storage device of claim 10, wherein the inheritance bit is not set, and wherein the program of instructions are further executable by the machine to perform method steps of:
when the resource becomes available, granting a lock for the child resource of the requestor that sent the first request in the queue; and
in response to determining that the requestor that sent the first request in the queue violated the protocol, freeing the lock of the child resource of the requestor that sent the first request in the queue.

* * * * *